United States Patent [19]
Bujak, Jr.

[11] Patent Number: 5,863,246
[45] Date of Patent: Jan. 26, 1999

[54] VARIABLE AIR VOLUME CONTROL SYSTEM

[75] Inventor: Walter E. Bujak, Jr., Suffield, Conn.

[73] Assignee: Carrier Corporation, Syracuse, N.Y.

[21] Appl. No.: 990,691

[22] Filed: Dec. 15, 1997

[51] Int. Cl.[6] .................................. F24F 7/00; F24F 3/00
[52] U.S. Cl. .......................... 454/255; 165/212; 454/238
[58] Field of Search .......................... 236/49.3; 454/255, 454/229, 238; 165/214–217, 212

[56] References Cited

U.S. PATENT DOCUMENTS

| | | | |
|---|---|---|---|
| 4,635,445 | 1/1987 | Otsuka et al. .................... | 165/217 X |
| 4,836,095 | 6/1989 | Wright, Jr. ......................... | 454/255 |
| 5,123,592 | 6/1992 | Desmarais ......................... | 236/49.3 |

Primary Examiner—William Wayner

[57] ABSTRACT

A system controls the pressure at which conditioned is to be provided to one or more zones to be heated or cooled by the conditioned air. The system actively computes a setpoint for the pressure with a location in a duct system upstream of where any of the conditioned air is to be provided to the zones. The setpoint is computed as a function of the positional statuses of dampers within the duct system that regulate the flow of the conditioned air to the respective zones. The actively computed setpoint is compared with a sensed pressure in the duct system in order to determine whether the pressure in the duct system needs to be changed.

20 Claims, 5 Drawing Sheets

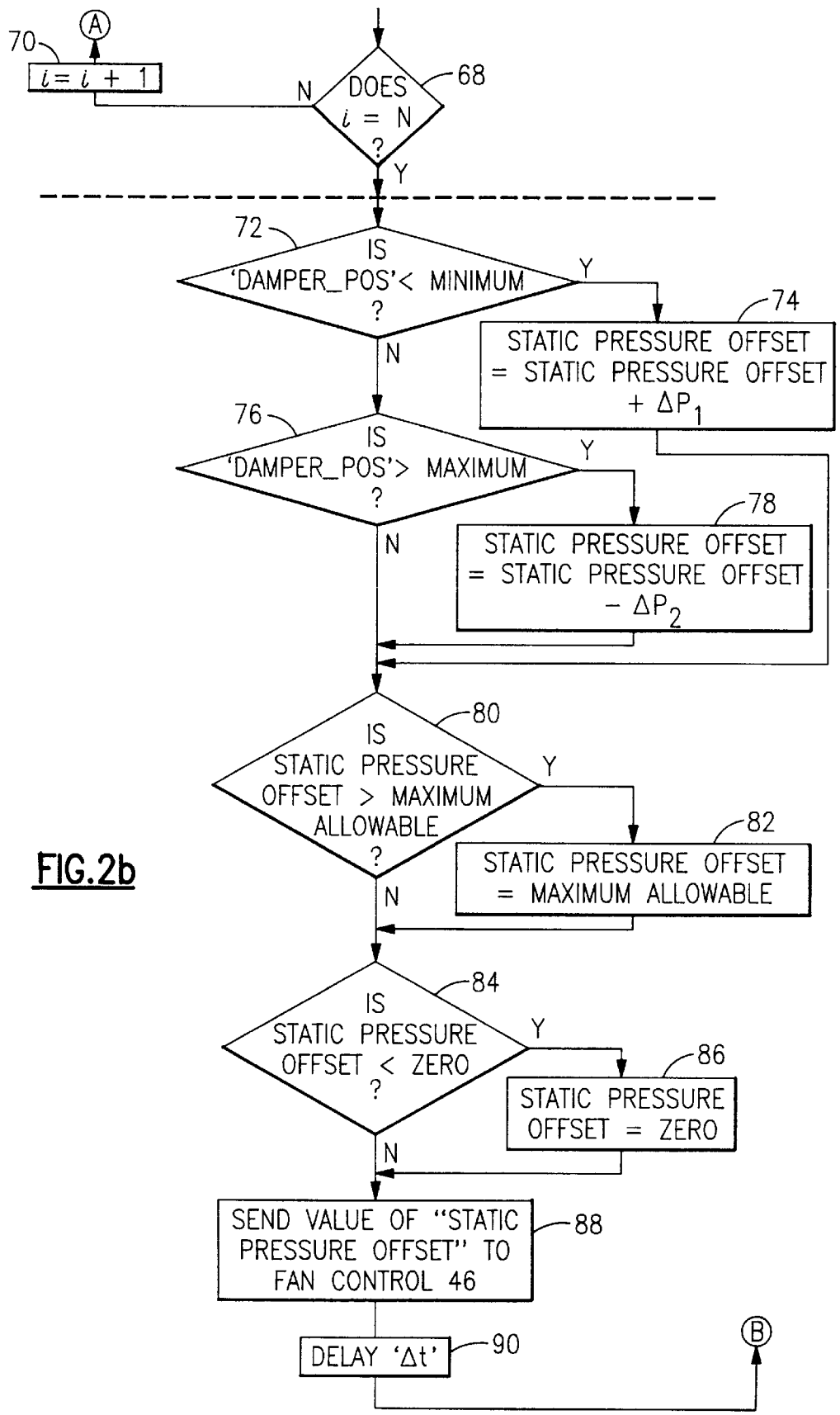

VARIABLE AIR VOLUME CONTROL SYSTEM

BACKGROUND OF THE INVENTION

This invention relates to controlling the movement of conditioned air to individual zones of a variable air volume system. In particular, this invention relates to the control of a fan which moves the conditioned air through the ducts of a variable air volume system.

The air supply fan within a variable air volume system, hereinafter referred to as a "VAV system" moves conditioned air down a supply duct to individual zones which are to be heated or cooled by the conditioned air. In order to move the air to these zones, the supply fan must generate sufficient pressure in the supply duct to overcome frictional losses experienced in moving the air to the zones. These frictional losses will vary depending on the level of demand for conditioned air by the individual zones.

To ensure that sufficient pressure is available at all times, a maximum fan discharge pressure requirement is typically established for the supply fan of a variable air volume system. This fan discharge pressure requirement is premised on the fan producing enough pressure in the supply duct to meet the maximum individual air flow requirements of the respective zones. The thus established fan discharge pressure requirement is generally known as a "static pressure set point" for the VAV system. This static pressure set point may be used to, for instance, control the speed of the supply fan. In this regard, a controller for the fan typically requires a variable speed fan motor to either speed up or slow down so as to meet the static pressure set point. It is to be understood that other types of fan control may also be used to meet the required static pressure setpoint.

It is to be appreciated that the supply fan need not always be required to generate the fan discharge pressure defined by the aforementioned static pressure set point. In this regard, there are many air flow or load conditions within the individual zones that do not require maximum air flow. When this occurs, the dampers within the VAV system must modulate the amount of air flow to the respective zones. This produces an increased pressure drop within the supply duct of the VAV system in order to achieve these modulated air flow rates. Conversely, the friction losses within the VAV system decrease exponentially as these individual VAV dampers throttle down the amount of air flow to the individual zones. These frictional and damper pressure drop losses impact the efficiency of the VAV system. It is therefore to be appreciated that under any condition other than full load for the system, the fan will be supplying an excessive amount of pressure which must be offset by closing dampers in order to reduce the air flow to the respective zones.

It is an object of the invention to provide a fan control for a VAV system which does not always require that discharge duct pressure be maintained at an artificially high static pressure set point.

It is another object of the invention to provide a fan control which can adjust the fan discharge pressure to an appropriate level dictated by any load condition of the VAV system.

SUMMARY OF THE INVENTION

The above and other objects are achieved by providing a control for a VAV system that periodically checks the position of each damper regulating the supply of conditioned air from a supply duct to a respective zone being heated or cooled. The information collected from checking all dampers is used to compute an offset to a set point value for the static pressure in the supply duct upstream of the dampers. If all damper are open less than a predetermined minimum amount, then the computation of an offset is triggered. This computation results in the present offset being increased by a predetermined incremental amount. If any damper is, on the other hand, open by more than a predetermined maximum amount, then a different computation of a new offset value is triggered. This latter computation results in the present offset being decreased by a predetermined amount, which may differ from the predetermined incremental amount used in the first computation.

In a preferred embodiment, the aforementioned computations are performed in a system controller connected to zone controllers of the respective dampers. The results of any such computations are communicated to a fan controller which adjusts the current supply duct static pressure set point by the communicated offset value. The fan controller thereafter controls a fan supplying air to the supply duct of the VAV system in a manner so as to thereby comply with the newly defined supply duct static pressure set point.

BRIEF DESCRIPTION OF THE DRAWINGS

Other objects and advantages of the invention will be apparent from the following description in conjunction with the accompanying drawings, in which

FIGS. 2A and 2B illustrate a process executed by a system controller within the variable air volume system of FIG. 1 which collects damper position information from the zone controllers associated with the dampers and computes a static pressure offset value.

DESCRIPTION OF THE PREFERRED EMBODIMENT

Figure 1:
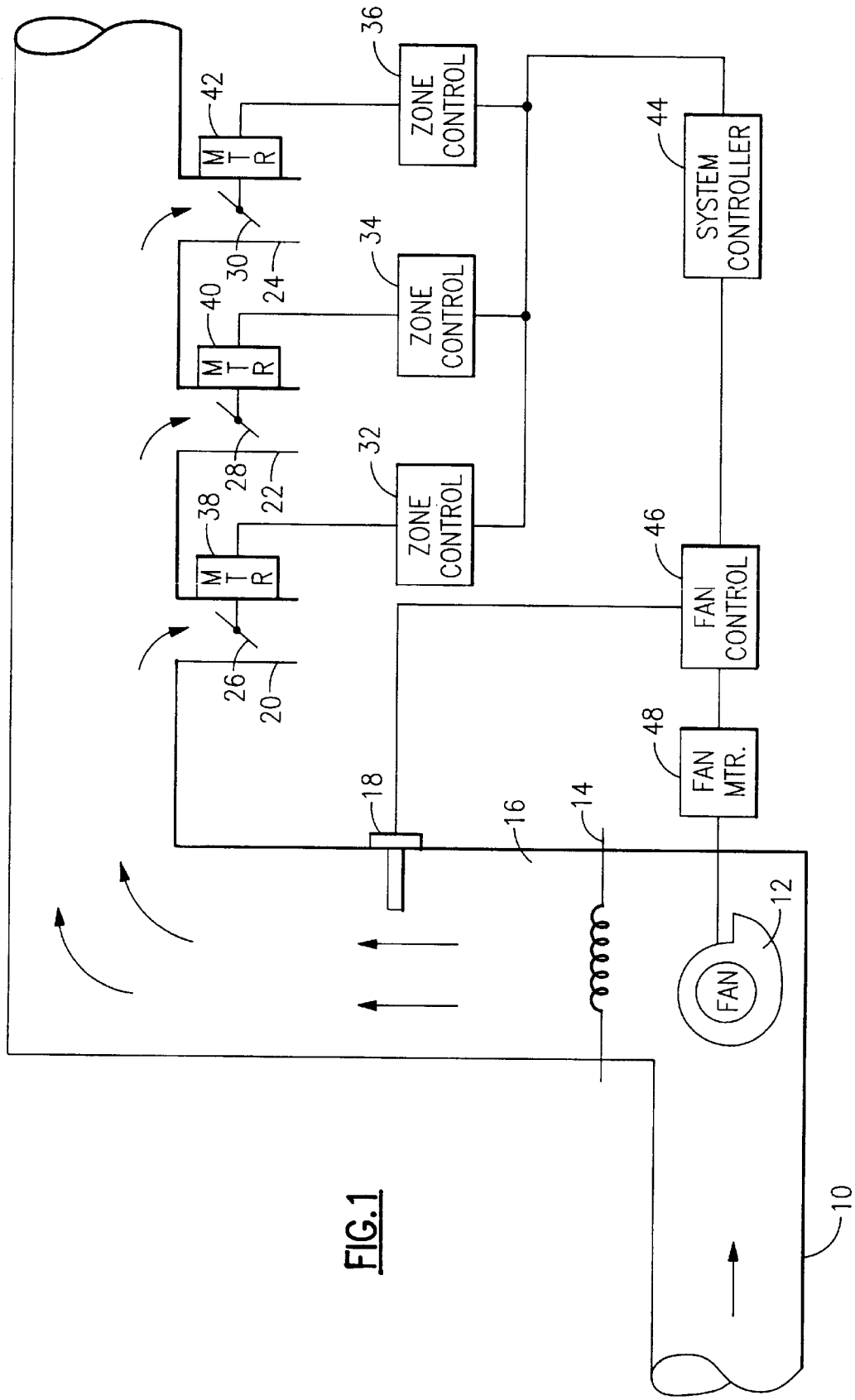
FIG. 1 is an overall diagram of a variable air volume system having a plurality of dampers providing conditioned air to respective zones to be heated or cooled.

Referring to FIG. 1, air returning from various zones via a return duct 10 is drawn into a fan 12. The fan 12 is operative to distribute the received air over a heat exchange element 14, which either heats or cools the air passing thereover. It is to be appreciated that the volume of air passing over the heat exchange coil per unit of time will depend on the speed of the fan 12. This in turn establishes a static air pressure downstream of the fan 12 within a supply duct 16. This static pressure within the duct 16 is sensed by a pressure sensor 18.

The air moves down the supply duct 16 to various branch ducts, such as 20, 22 and 24. Dampers 26, 28 and 30 within these branch ducts control the flow of conditioned air to respective zones associated with the branch ducts. Zone controls 32, 34 and 36 control the temperatures within the respective zones by modulating the positions of these dampers via motors 38, 40 and 42. Each damper provides a restriction to the flow of air and thus a pressure differential across the damper. It is to be appreciated that any damper which is substantially closed so as to severely limit air flow to a zone will produce a substantial pressure drop across the dampers 26, 28 and 30.

A system controller 44 receives damper position information from the respective zone controls 32, 34 and 36. As will be explained in detail hereinafter, the system controller is operative to compute a static pressure offset value based on the damper position information received from the respective zone controls. This static pressure offset value is provided to a fan control 46. As will be explained in detail hereinafter, fan control 46 is operative to adjust a static pressure set point either upwardly or downwardly depending on the static pressure offset value communicated from the system controller 44. The thus adjusted static pressure set point is used to control the speed of the fan 12 through a variable speed fan motor 48 so as to thereby either increase or decrease the static pressure in the duct 16 downstream of the heat exchange element 14. The static pressure is either increased or decreased in the supply duct 16 until such time as the sensed static pressure by pressure sensor 18 equals the controlling static pressure set point established in the fan control 46 as a result of any receipt of a static pressure offset value from the system controller 44.

Figure 2A:
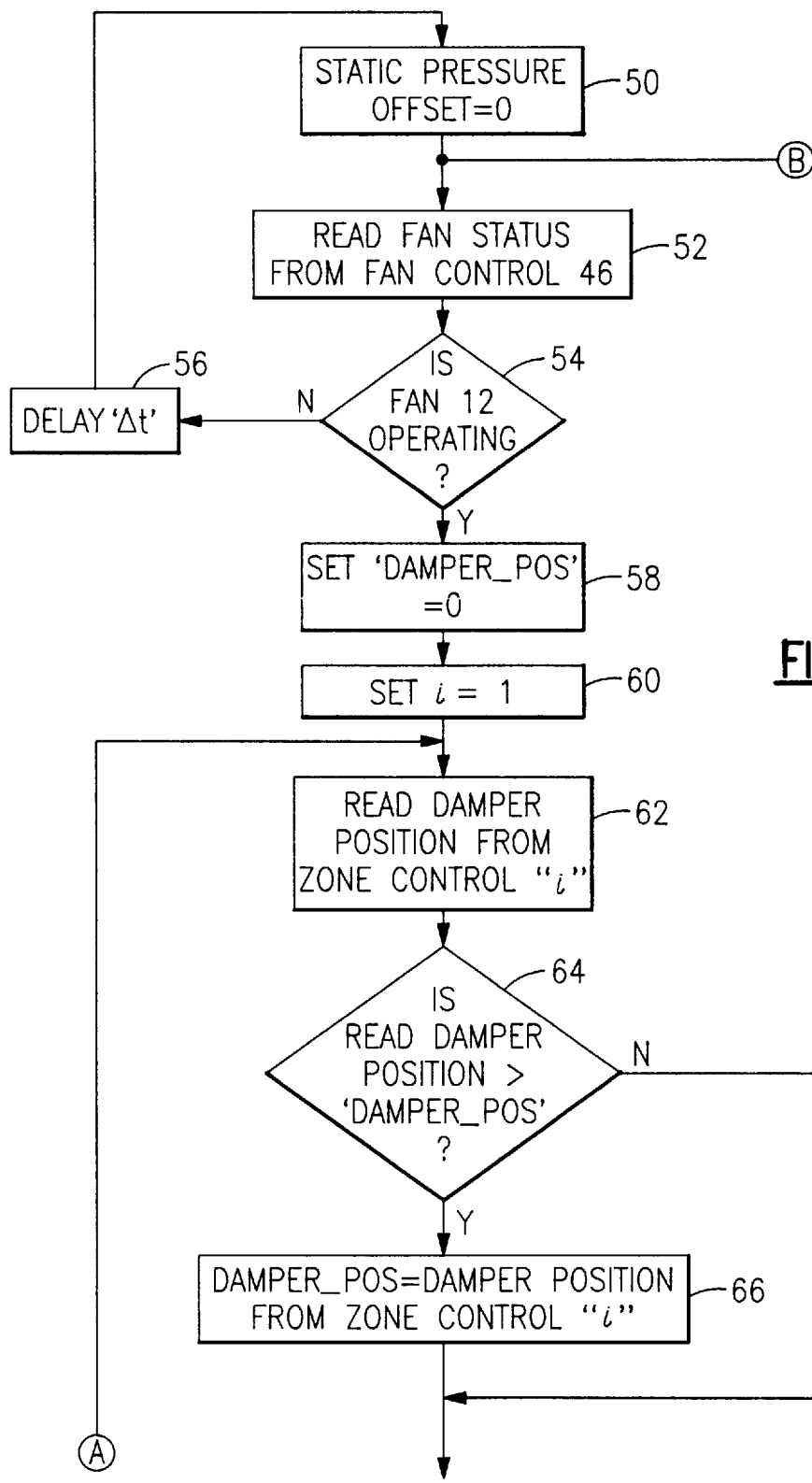

Referring to FIG. 2, the process for computing static pressure offset values within the system controller 44 is illustrated. It is to be appreciated that the system controller preferably includes a programmable computer which can execute the process of FIG. 2. The process begins with setting a static pressure offset variable equal to zero in a step 50. The system controller proceeds in a step 52 to read the status of the fan 12 from the fan controller 46. The fan controller 46 will indicate the status of the fan by noting whether the fan motor 48 is currently driving the fan 12. The system controller 44 will use the read fan status to note whether the fan 12 is operational in a step 54. In the event that the fan 12 is not operational, the system controller will proceed along the no path to a step 56 and implement a delay of Δt before again proceeding to step 50. In the event that the fan 12 is operational, the system controller will proceed to a step 58 and set a variable, DAMPER_POS, equal to zero. The system controller proceeds in a step 60 to set an address index "i" equal to one. The system controller next proceeds to a step 62 and reads the damper position from the zone control having the address index "i". This can be is accomplished by for instance noting the address corresponding to the current address index value in an address lookup table and thereafter addressing the particular zone control having the thus noted address. The read instruction to the particular addressed zone control results in a damper position value being communicated back from the particular zone control to the system controller 44. Each damper position will preferably be read as a fractional amount of a completely open damper position. In other words, if a damper is completely open so as to not oppose air flow in a branch duct, then the fractional amount of damper position would be one hundred percent. On the other hand, if the damper were closed so as to completely shut down air flow, then the fractional amount of open damper position would be zero percent. It is highly unlikely that any damper will be at either of these extremes.

Referring now to step 64, the system controller inquires as to whether the read damper position from step 62 is greater than the current value of the variable DAMPER_POS. It will be recalled that the variable DAMPER_POS was initially set equal to zero in step 58. The system controller will hence initially proceed to step 66 and set the variable DAMPER_POS equal to the read damper position from the presently addressed zone control "i". The processor proceeds from step 66 to step 68 and inquires whether the address index "i" equals N. It is to be appreciated that the value of N will be the total number of zone controls within the particular VAV system that are to be addressed and queried as far as damper position value. In the event that the address index "i" does not equal N, the system controller will proceed to step 70 and increment the address index "i" before returning to step 62 wherein the zone control identified by the present address index is addressed and thereafter read for damper position value. In the event that this damper position value is greater than the presently stored damper position value in DAMPER_POS, then the system controller proceeds to set DAMPER_POS equal to currently read damper position value in step 66.

It is to be appreciated that at some point in time all zone controls will have been read and the largest damper position read from any of the addressed zone controls will have been stored as the present value of the variable DAMPER_POS. The system controller will proceed to a step 72 and inquire as to whether the present value of the variable DAMPER_POS is less than a minimum value that has been established for this variable. It is to be appreciated that this minimum value will define the least open position of any of the dampers in the VAV system.

As has been previously noted, the values of damper position read by the system controller will be uniformly expressed as fractional positions of completely open dampers. If the minimum value established in step 72 is for instance 50% of a completely open damper position, then any value of the variable DAMPER_POS that is less than 50% would prompt the system controller to proceed to a step 74 wherein a value of static pressure offset is computed. The value thus computed is equal to the current value of static pressure offset plus an incremental value of pressure noted as $\Delta p_1$. This value of pressure may be, for instance, a fixed value chosen so as to normally produce a relatively small decrease in static pressure within the normal range of static pressure likely to be experienced by the particular VAV system. Alternatively, this value could be actively computed as a function of the difference between the minimum allowed damper position set forth in step 72 and the actually stored damper position in DAMPER_POS. For instance, if the minimum allowed damper position and the actual stored damper position were expressed as a percentage of an open damper, then the computation could be:

$$\Delta p_1 = \{(\text{Allowed Minimum} - \text{DAMPER\_POS})/100\} * \{(\text{Design Static Pressure Setpoint})/2\}$$

Referring back to step 72, in the event that the value of the variable DAMPER_POS is not less than the minimum value required for all dampers, then the system controller will proceed to a step 76. Referring to step 76, the system controller inquires whether the value of the variable DAMPER_POS is greater than some maximum value for all dampers in the VAV system. The maximum value of damper position will preferably be expressed as a fractional amount of open damper position since all read damper positions of the VAV system will have been preferably defined in this manner. Assuming that this maximum fractional value is 90% of a completely open damper position and, furthermore, assuming that at least one damper is greater than this stipulated fractional amount, then the system controller will proceed to step 78 and compute a new value of "static pressure offset". The static pressure offset will in this instance be set equal to the present value of static pressure offset minus an incremental amount of static pressure indicated by $\Delta p_2$. It is to be noted that $\Delta p_2$ may be larger or smaller than $\Delta p_1$, depending on how much downward adjustment is to be made at any one point in time. This value of pressure may be, for instance, a fixed value chosen so as to normally produce a relatively small increase in static pressure within the normal range of static pressure likely to be experienced by the particular VAV system. Alternatively, this value could be actively computed as a function of the difference between the maximum allowed damper position set forth in step 76 and the actually stored damper position in DAMPER_POS. For instance, if the maximum allowed position and the actual stored value of damper position were expressed as a percentage of an open damper, then the computation could be:

$$\Delta p_1 = \{(DAMPER\ POS\_Maximum\ Allowed)/100\} * \{(Design\ Static\ Pressure\ Setpoint)/2\}$$

Referring now to step 80, it is to be appreciated that the system controller will implement this step regardless of whether step 74, step 76 or step 78 was previously executed. The current value of the static pressure offset variable will be compared in step 80 with the maximum allowable value permitted for this variable. This value may be, for instance, set at a percentage of the design static pressure set point such as fifty percent (50%). This value will have been initially entered into the system controller so that it is available for use by the system controller when executing step 80.

In the event that the maximum allowable value for static pressure offset has been exceeded, then the system controller will proceed to a step 82 and set the value of static pressure offset equal to the maximum allowable offset value. The system controller will proceed out of either step 80 or 82 to step 84. Referring to step 84, the system controller inquires whether the value of "static pressure offset" is less than zero. It is to be appreciated that the static pressure offset may be less than zero as a result of the static pressure offset computation in step 78. In the event that static pressure offset is less than zero, the system controller proceeds to step 86 and sets the static pressure offset variable equal to zero. The system controller will proceed from either step 84 or 86 to a step 88. Referring to step 88, the system controller sends the value of "static pressure offset" to fan control 46. It is to be appreciated that this static pressure offset will be a value varying anywhere from zero to the maximum allowable offset. The value will moreover be an upwardly adjusted value of the previous static pressure offset in the event that all dampers are less than a predefined minimum of acceptable open damper position. It is also to be appreciated that the static pressure offset may be a downwardly adjusted value in the event that at least one damper position is noted to be above the maximum allowable open damper position. The particular value of the static pressure offset that has been thus computed will be sent to the fan controller by merely addressing the fan controller and thereafter transmitting this value thereto. The system controller proceeds from step 88 to implement a delay of $\Delta t$ in a step 90. The system controller will thereafter loop back to step 52 and read the status of the fan 12 from fan control 46.

It is to be appreciated that the delay of $\Delta t$ between subsequent readings of the fan control 46 appears in both step 56 and step 90. Each of these steps preferably includes the same time delay. This time delay must be sufficient so as to allow the fan control 46 to react to whatever static pressure offset has been communicated to it in a step 88. This minimum delay time is one minute in a particular preferred embodiment.

Figure 3A:
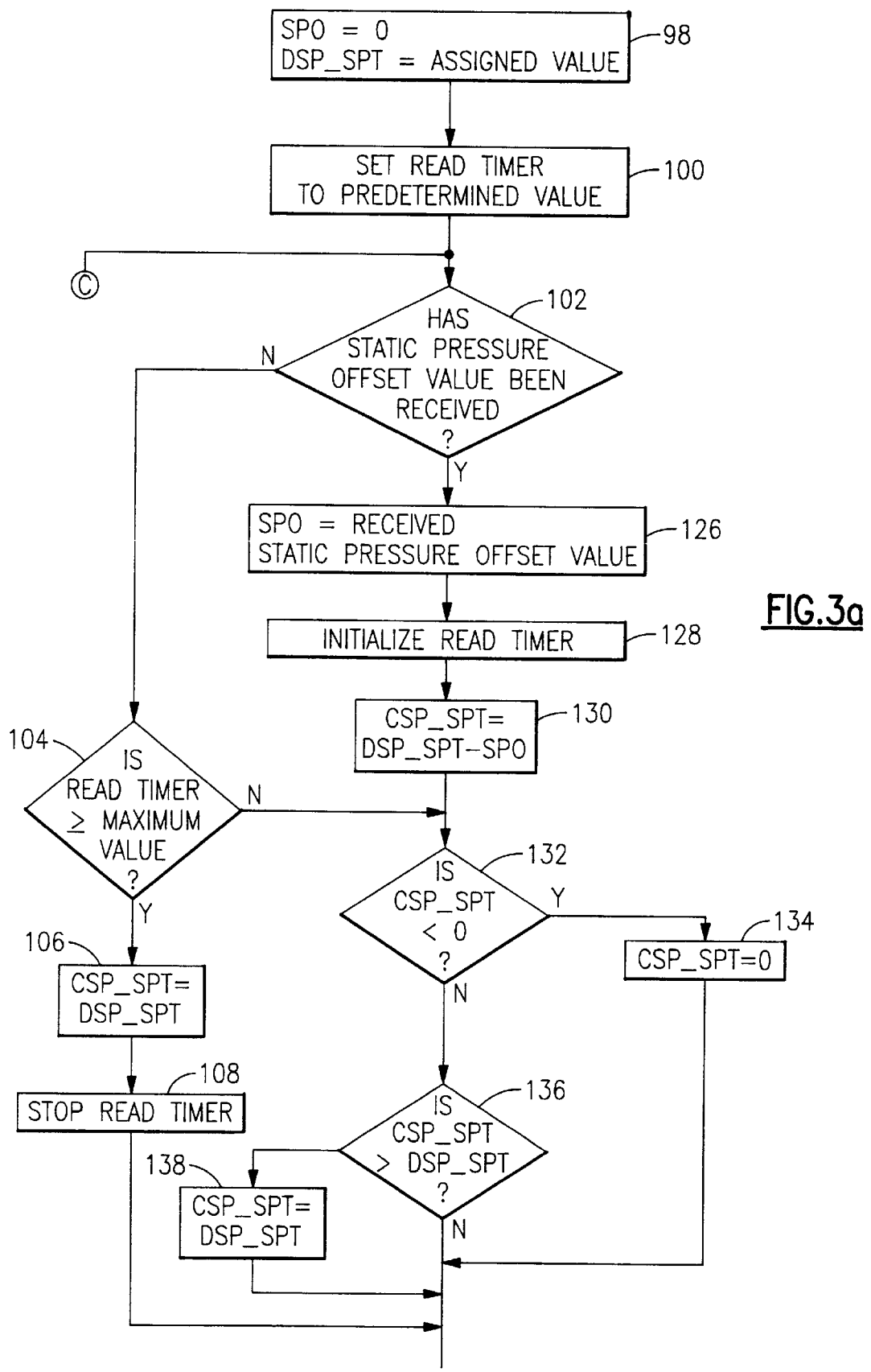
FIGS. 3A and 3B illustrates a process executed by a fan controller within the VAV system of FIG. 1, which controls the supply fan in response to static pressure offset values communicated thereto from the system controller.
Figure 3B:
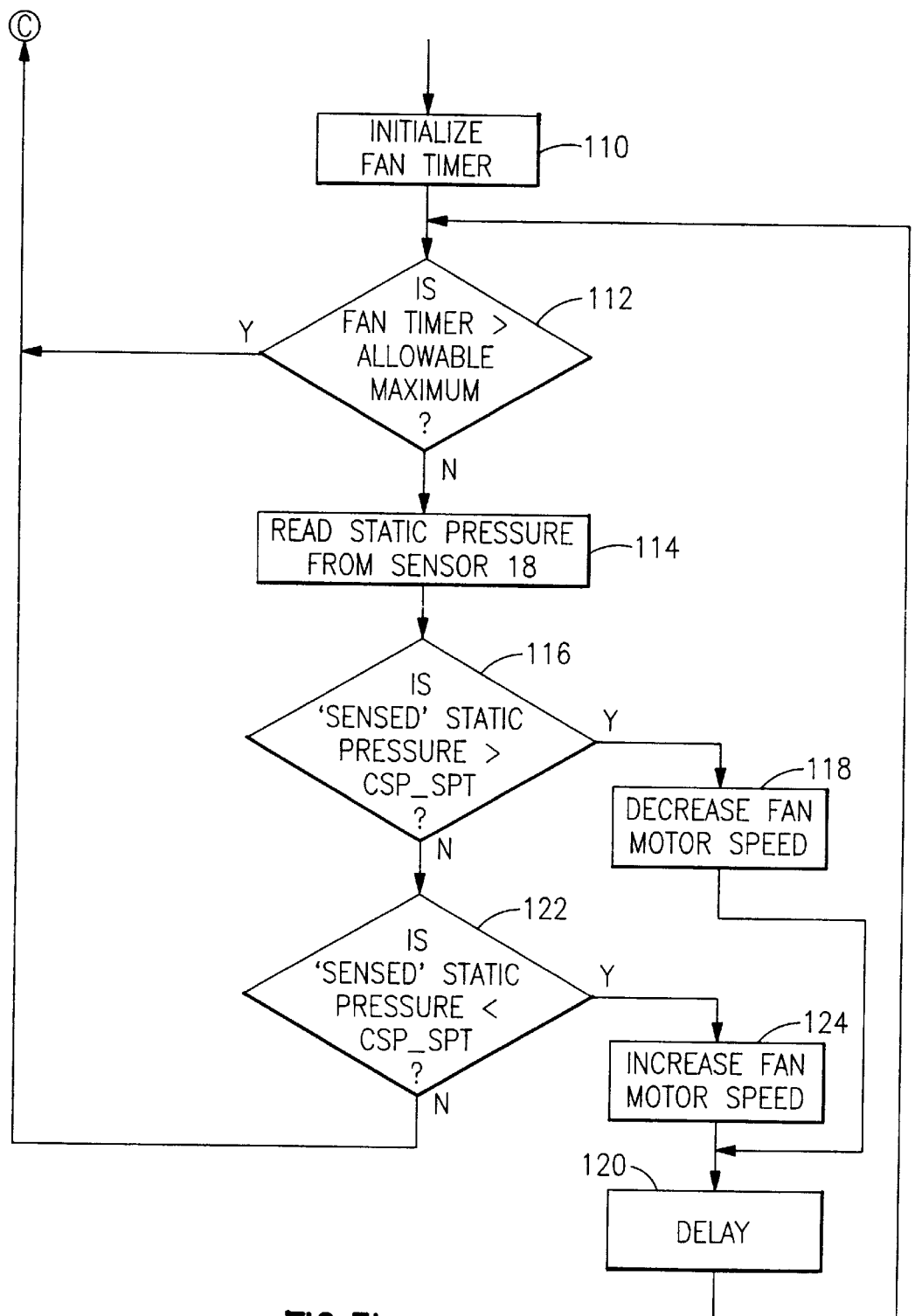

Referring now to the process executable by the fan control 46 as illustrated in FIG. 3. It is to be appreciated that this process is preferably executable by a programmed computer within the fan control. This process begins with a step 98 wherein certain values are assigned to variables used within this process. In particular, a variable "SPO" is set equal to zero. As will be explained in detail hereinafter, this variable will contain any communicated value of static pressure offset from the system controller 44. Another variable identified as "DSP_SPT" is set equal to an assigned value for this variable. The assigned value for this variable is preferably the static pressure downstream of the fan 12 in the supply duct 16 that is necessary to move a sufficient volume of air down the supply duct at a rate that will ensure that all zones will meet their individual maximum air flow requirements. It is to be appreciated that this value is computed externally to the process of FIG. 3A and merely provided to the fan control 46 as an assigned value for the variable DSP_SPT. This variable will be referred to hereafter as the design static pressure setpoint.

The fan control 46 proceeds in a step 100 to set a "read timer" to a particular predetermined value whereby the timer will begin incrementing from this value. As will be explained hereinafter, the read timer normally provides a timed indication as to how much time has elapsed since the previous read of a static pressure offset value from the system controller 44. The particular value that this read timer is initially set to in step 100 will be the normal maximum period of time that is allowed to elapse between successive readings of static pressure offset.

The fan control proceeds from step 100 to a step 102 and inquires as to whether a static pressure offset value has been received from the system controller 44. It will be remembered that the system controller 44 periodically transmits values of static pressure offset during execution of the process described in FIG. 2. When this communication is received by the fan control 46, it is held in a buffer storage pending execution of step 102. Assuming that a static pressure offset value has not been received from the system controller, the fan control will proceed from step 102 along a no path to step 104 and inquire as to whether the read timer is greater than or equal to the maximum value allowed for this timer. Since the read timer will initially be set equal to this maximum value in step 100, the fan control will proceed to a step 106 and set a controlling static pressure setpoint variable, CSP_SPT equal to DSP_SPT. As will be explained hereinafter, the variable CSP_SPT is the actual static pressure setpoint value that will be used to control the fan 12. The fan control in step 106 merely sets this controlling static pressure setpoint equal to the present value of the design static pressure setpoint DSP_SPT that was assigned in step 98. The fan control proceeds from step 106 to step 108 and stops the read timer.

The fan control proceeds from step 108 to a step 110 and initializes a fan timer to zero. This particular timer will define the allowable time during which the fan control 46 may control the fan motor 48 and hence the fan 12 to a particular established value of controlling static pressure setpoint. The fan control proceeds to a step 112 and inquires as to whether this fan timer has exceeded a maximum allowable value for this particular timer. The maximum allowable time for the fan timer is preferably the same $\Delta t$ amount of time that must occur between successive static pressure offset computations performed by the system controller. This will normally assure that each computed static pressure offset is received by the fan control and thereafter used in the control of the fan motor 48. As long as this allowable maximum time has not been exceeded, the fan control will proceed to read the static pressure from sensor 18 in step 114. The thus read static pressure from sensor 18 is compared with the controlling static pressure setpoint CSP_SPT in a step 116. Specifically, the comparison is made as to whether the sensed static pressure from sensor 18 is greater than the value of CSP_SPT. In the event that the answer is yes, the fan control will proceed to decrease the fan motor speed that is to be commanded of the variable speed fan motor 48 in a step 118. The incremental change in the commanded fan motor speed will preferably produce only a slight change in the current fan motor speed. This small incremental change should produce a relatively fine control gradient for the fan 12 while still achieving a typically experienced controlling setpoint within a reasonable period of time. The fan control will proceed to implement a small delay in a step 120, which is preferably no more than the time necessary for the fan motor 12 to respond to the commanded change in the fan motor speed. It is to be appreciated that this will be significantly less than the $\Delta t$ period of time during which the fan control may adjust the fan motor speed several times to achieve a given value of controlling static pressure setpoint. The fan control will proceed after implementing the delay of step 120 to return to step 112 wherein the fan timer is again checked for having exceeded the maximum allowable time for this particular timer. As has been previously noted, this allowable time for the fan timer is approximately equal to the period between successive computations of static pressure offset. This maximum allowable time is preferably one minute. This will allow many different iterations of steps 114 through 120 before this allowable maximum period of time has elapsed.

Referring again to step 116, in the event that the sensed static pressure is not greater than the controlling static pressure setpoint, then the fan control will proceed to a step 122 and inquire as to whether the sensed static pressure is less than the value of CSP_SPT. In the event that the sensed static pressure is less than the controlling static pressure setpoint, the fan controller will proceed to a step 124 and increase the speed of the variable speed fan motor 48 by a predefined amount before proceeding to implement the short delay of step 120. It is hence to be appreciated that the fan speed of the fan 12 will either be decreased or increased depending on whether the sensed static pressure is greater than or less than the controlling static pressure setpoint. This upward or downward adjustment of the variable speed fan motor 48 will continue until such time as the fan timer has exceeded its maximum allowable time or the sensed static pressure is equal to the controlling static pressure setpoint. In either case, the fan control proceeds back to step 102 wherein inquiry is again made as to whether a static pressure offset value has been received from the system controller 44.

As has been previously noted, the fan timer should time out at approximately the same time that the system controller 44 has executed the process of FIG. 2 and transmitted a value of static pressure offset to the fan control 46. This static pressure offset value should be noted by the fan control in step 102 prompting the fan control to proceed to a step 126 wherein the variable SPO is set equal to the received static pressure offset value from the system controller 44. The fan control now proceeds to step 128 and initializes the read timer. As has been previously noted, this timer defines the amount of time between successive readings of a communicated value of static pressure offset from the system controller 44.

The fan control now proceeds to a step 130 wherein a value of the controlling static pressure setpoint is computed. In this regard, CSP_SPT is set equal to the value of DSP_SPT minus the value of SPO. This particular formula is seen to adjust the design static pressure setpoint downwardly by the communicated static pressure offset value from the system controller 44. Inquiry is now made in a step 132 as to whether the thus calculated value of controlling static pressure setpoint is less than zero. It is to be appreciated that this value should not be less than zero due to the limiting of any computed static pressure offset value in the process of FIG. 2 to a maximum allowable value. Notwithstanding this limiting action in the process executed by the system controller, the fan control does check for the controlling setpoint being less than zero due to perhaps an error in either the entry of the maximum allowable offset value used by the system controller in step 80 or the transmission of the static pressure offset value from the system controller. In the event that the controlling setpoint is less than zero as a result of the computation of step 130, the fan control will proceed to a step 134 and set CSP_SPT equal to zero. Referring again to step 132, in the event that the computed value of controlling static pressure setpoint is equal to or greater than zero, the fan control will proceed to step 136. Referring to step 136, the question is asked as to whether the computed controlling static pressure setpoint of FIG. 130 is greater than the design static pressure setpoint. This may occur if, for instance, the transmission of the value of static pressure offset from the system controller is somehow flawed so as to produce a negative offset which when subtracted from the design static pressure setpoint in step 130 produces a value greater than design static pressure setpoint. If this is the case, the fan control will proceed from step 136 to a step 138 and set the controlling static pressure setpoint equal to the value of the design static pressure setpoint variable. It is to be appreciated that the fan control will proceed to step 110 from either step 134, 136 or 138.

Referring to step 110, the fan timer is again initialized before proceeding to step 112 to inquire as to whether the fan timer has exceeded the maximum allowable value for controlling the fan motor to the particular established value of controlling static pressure setpoint. The fan control will now proceed to step 114 and read the static pressure from the sensor 18 before inquiring as to whether the sensed static pressure is either greater than the controlling static pressure setpoint in step 116 or is less than the controlling static pressure setpoint in step 122. In the event that the sensed static pressure is greater than the controlling static pressure setpoint, the fan control will proceed to decrease the speed of the variable speed fan motor 48 in step 118. In the event that the sensed static pressure is less than the controlling static pressure setpoint, then the fan control will increase the fan motor speed by a predetermined incremental amount. It is to be appreciated that if the speed of the variable speed motor is decreased in step 118, then the resulting volume rate of air produced by the fan 12 will drop off thereby causing a lessening of the static pressure in the duct 16. This should bring the sensed static pressure down towards the controlling static pressure setpoint.

Referring to step 122, in the event that the static pressure sensed by the sensor 18 is less than the controlling static pressure setpoint, then a command is sent to the variable speed fan motor which increases the speed of this motor. This is followed by the short delay 120, which should be sufficient to allow the fan 12 to establish a new static pressure to be sensed by the static pressure sensor 18 in step 114. If the sensed static pressure remains below the controlling static pressure setpoint, then the same will be so noted in step 122 prompting the fan control to again increase the fan speed by the same incremental amount. It is to be appreciated that at some point in time, the fan control may have increased the speed of the variable speed motor sufficiently to bring the sensed static pressure into equilibrium with the controlling static pressure setpoint. At this time, the fan control will proceed from step 122 back to step 102. In the event that the fan speed is not however incremented sufficiently to cause the sensed static pressure to equal the controlling static pressure setpoint during the allowable time for the fan timer, then the fan control will proceed from step 112 back to step 102. In either event, the fan control will look for a new communicated static pressure offset value from the system controller 44. As has been previously noted, this particular value of static pressure offset will be used to compute a new controlling static pressure setpoint value in step 130 before checking whether this value is appropriately within range stipulated in steps 132 through 138. The fan control proceeds from this checking to again control the variable speed fan motor 48 so as to increase or decrease the fan motor speed as has been previously discussed.

Referring to step 102, it is to be noted that if a static pressure offset value has not been received during the timing out of the fan timer or following achievement of the current controlling static pressure setpoint, then the fan control will proceed to step 104 to inquire as to whether the read timer has reached the maximum value. As long as this maximum value has not been exceeded, the fan control will proceed to step 130 and simply again perform the computation of controlling static pressure setpoint as has been previously described. It is to be noted, however, that if a static pressure offset value has not been received after several iterations of having controlled the fan motor to the current controlling static pressure setpoint, then the read timer will exceed the maximum value allocated therefor. At such time, the fan control will proceed to step 106 and set the controlling static pressure setpoint equal to the design static pressure setpoint as has been heretofore described.

It is to be appreciated that a preferred embodiment of the invention has been set forth. Alterations and modifications thereof may occur without departing from the scope of the invention. For instance, the system controller and the fan controller could be integrated into one control unit. The fan control 46 may also control something other than a variable speed fan motor 48 so as thereby adjust the static pressure within the supply duct 16. For instance, the fan control might modulate inlet guide veins to a constant speed fan so as to thereby control the volume flow rate of air downstream of the fan 12. It is also to be appreciated that a combination of control of inlet guide veins and fan motor speed could also be implemented so as to thereby define various static pressure downstream of the fan 12. This resulting static pressure would be sensed by the sensor 18 and compared to a controlling setpoint as established in accordance with the process executed by the system controller 44.

What is claimed is:

1. A process for controlling the pressure within a supply duct of a variable air volume system, said process comprising the steps of defining a setpoint for the static pressure in a supply duct upstream of one or more outlets formed in the supply duct which provide air to branch ducts associated therewith;

computing an offset to the defined setpoint for the static pressure in the supply duct as a function of the positional status of dampers located in one or more of the branch ducts;

adjusting the defined setpoint for the static pressure in the supply duct by the computed offset so as to thereby generate a controlling static pressure setpoint;

sensing the static pressure in the supply duct at a point upstream of the outlets formed in the supply duct;

comparing the sensed static pressure in the supply duct to the controlling static pressure setpoint; and adjusting the pressure in the supply duct depending on the comparison of the sensed static pressure to the controlling static pressure setpoint.

2. The process of claim 1 wherein said step of computing an offset to the defined setpoint for the static pressure comprises the steps of noting which of the dampers in the branch ducts is the most open damper;

comparing the position of the most open damper with a minimum open position that is to be allowed for this damper; and increasing the offset when the position of the most open damper is less than the minimum that is to be allowed for this damper.

3. The process of claim 2 wherein said step of computing an offset to the defined setpoint for the static pressure further comprises:

comparing the position of the most open damper with a maximum open position that is to be allowed for this damper;

decreasing the offset of the setpoint for the static pressure in the supply duct when the position of the most open damper is greater than the maximum open position that is to be allowed for this damper.

4. The process of claim 1 wherein said step of computing an offset to the defined setpoint for the static pressure in the supply duct comprises noting the positional status of the damper in each branch duct which governs the flow of air from the supply duct to a zone which is to receive the air;

comparing the positional status of the most open of such dampers in the respective branch ducts with a minimum open damper position that is to be allowed for all similarly situated dampers in other branch ducts governing the flow of air from the supply duct to respective zones associated with such branch ducts; and increasing the current offset when the positional status of the most open damper is less than the minimum open damper position that is to be allowed for all similarly situated dampers in the branch ducts.

5. The process of claim 4 wherein said step of computing an offset to the defined static pressure setpoint further comprises:

noting the positional status of the damper in each branch duct which governs the flow of air from the supply duct to a zone which is to receive the air;

comparing the positional status of the most open of such dampers in the respective branch ducts with a maximum open damper position that is to be allowed for all similarly situated dampers in other branch ducts governing the flow of air from the supply duct to respective zones associated with such branch ducts; and decreasing the current offset when the position of the most open damper is less than the minimum open damper position for all similarly situated dampers in the branch ducts.

6. The process of claim 5 wherein the positional status of each damper is expressed as an amount of a particular damper position whereby each positional status will have a common basis for comparison to other positional statuses noted during said step of computing an offset to the defined static pressure setpoint.

7. The process of claim 1 further comprising the steps of:

checking whether a computed offset is within an acceptable range of offset values; and resetting the computed offset to a minimum or maximum offset value depending on whether the computed offset is below or above the acceptable range of offset values before proceeding to said step of adjusting the defined static pressure setpoint by the computed offset.

8. The process of claim 1 wherein said step of adjusting the pressure in the supply duct depending on the comparison of the sensed static pressure to the controlling static pressure comprises the steps of:

increasing the speed of a fan in the supply duct by a predefined amount when the sensed static pressure is less than the controlling static pressure setpoint;

decreasing the speed of a fan in the supply duct by a predefined amount when the sensed static pressure is greater than the controlling static pressure; and further comparing the static pressure in the supply duct following said steps of increasing or decreasing the speed of the fan in the supply duct.

9. A process for controlling the pressure of conditioned air within a supply duct of a variable air volume system, said process comprising the steps of:

repetitively sensing the static pressure of the conditioned air within the supply duct at a location upstream of a plurality of outlets in the supply duct which provide conditioned air to branch ducts wherein each branch duct has at least one damper associated therewith for regulating the flow of conditioned air to a zone to be heated or cooled;

repetitively computing a setpoint for the sensed static pressure of the conditioned air within the supply duct as a function of the positional statuses of the dampers in the branch; and adjusting the static pressure in the supply duct to meeting the currently computed setpoint.

10. The process of claim 9 wherein said step of repetitively computing a setpoint for the sensed static pressure of the conditioned air within the supply duct comprises the step of:

reading the positional statuses of the damper associated with respective branch ducts at least once;

proceeding to compute a setpoint for the sensed static pressure of the conditioned air within the supply duct as a function of the read positional statuses of the dampers.

11. The process of claim 10 wherein said step of repetitively computing a setpoint for the sensed static pressure of the conditioned air within the supply duct further comprises the step of:

adjusting a predetermined setpoint when the positional statuses of the dampers associated with the respective branch ducts indicate that the previously computed setpoint needs to be changed.

12. The process of claim 11 wherein said step of repetitively computing a setpoint for the sensed static pressure of the conditioned air within the supply duct further comprises:

computing an offset to the predetermined setpoint when the positional statuses of the dampers associated with the branch ducts indicate that the previously computed setpoint needs to be changed.

13. The process of claim 12 wherein said step of computing an offset to the predetermined setpoint comprises:

increasing a previously computed offset when the positional statuses of the dampers associated with the branch ducts are all below a predetermined minimum allowable open position for each damper.

14. The process of claim 13 wherein said step of computing an offset to the predetermined setpoint comprises:

decreasing a previously computed offset when the positional statuses of the dampers associated with the branch ducts indicate that at least one damper is open more than a predetermined allowable open maximum position for each damper.

15. A control system for controlling the pressure of conditioned air within a supply duct of a variable air volume system, said control system comprising:

a sensor for repetitively sensing the static pressure of the conditioned air within the supply duct at a location upstream of a plurality of outlets in said supply duct which provides the conditioned air to respective branch ducts wherein each branch duct has at least one damper associated therewith for regulating the flow of the conditioned air to a zone to be heated or cooled; and computer means operative to repetitively compute a setpoint for the sensed static pressure of the conditioned air within the supply duct as a function of the positional statuses of the dampers in the branch ducts whereby the sensed static pressure in the supply duct may be thereafter compared with the currently computed setpoint.

16. The control system of claim 15 wherein said computer means is operative to read the positional statuses of the dampers in the branch ducts at least once prior to each repetitive computation of a setpoint for the sensed static pressure of the conditioned air within the supply duct.

17. The control system of claim 16 wherein said computer means is operative to adjust a predetermined setpoint initially provided to said computer means as part of any computation of the setpoint for the sensed static pressure in the supply duct when the positional statuses of the dampers associated with the respective branch ducts indicate that the previously computed setpoint needs to be changed.

18. The control system of claim 17 wherein said computer means is operative to compute an offset to the predetermined setpoint initially provided to said computer means as part of the computation of the setpoint for the sensed static pressure in the supply duct when the positional statuses of the dampers associated with the respective branch ducts indicate that the previously computed setpoint needs to be changed whereby the computed offset is thereafter used to adjust the predetermined setpoint initially provided to said computer means.

19. The computer means of claim 18 wherein said computer means is operative to increase a previous computed offset when the positional statuses of the dampers in the branch ducts are all below a predefined allowable minimum open position for each damper.

20. The computer means of claim 18 wherein said computer means is operative to decrease a previous computed offset when the positional statuses of the dampers in the branch ducts indicate at least one damper is open more than a predefined maximum allowable open position for each damper.

* * * * *